(12) United States Patent
Vanden Bussche et al.

(10) Patent No.: US 6,655,829 B1
(45) Date of Patent: Dec. 2, 2003

(54) STATIC MIXER AND PROCESS FOR MIXING AT LEAST TWO FLUIDS

(75) Inventors: Kurt M. Vanden Bussche, Lake in the Hills, IL (US); Suheil F. Abdo, Lincolnshire, IL (US); Volker Hessel, Hünstetten-Wallbach (DE); Holger Löwe, Oppenheim (DE); Steffen Hardt, Mainz (DE)

(73) Assignee: UOP LLC, Des Plaines, IL (US)

( * ) Notice: Subject to any disclaimer, the term of this patent is extended or adjusted under 35 U.S.C. 154(b) by 71 days.

(21) Appl. No.: 09/850,470

(22) Filed: May 7, 2001

(51) Int. Cl.⁷ .............................. B01F 5/04; B01F 13/00
(52) U.S. Cl. ................. 366/165.1; 366/173.1; 366/181.6; 366/341
(58) Field of Search .......................... 366/165.1, 165.2, 366/165.4, 165.5, 162.4, 173.1, 173.2, 177.1, 181.6, 341, 167.1, 166.1; 261/79.1, 79.2

(56) References Cited

U.S. PATENT DOCUMENTS

| | | | | |
|---|---|---|---|---|
| 1,048,111 A | * | 12/1912 | Tobey ........................ | 261/79.2 |
| 2,080,616 A | * | 5/1937 | Lynn et al. .............. | 366/165.1 |
| 2,763,699 A | * | 9/1956 | Van Dijk et al. .......... | 261/79.2 |
| 2,847,083 A | * | 8/1958 | Hibshman .................. | 261/79.2 |
| 3,643,406 A | * | 2/1972 | Ririe ........................ | 261/79.2 |
| 3,730,494 A | * | 5/1973 | Sterlini ...................... | 261/79.2 |
| 4,461,742 A | * | 7/1984 | Rowe et al. ............. | 366/165.1 |
| 4,521,117 A | * | 6/1985 | Ouwerkerk et al. ..... | 366/162.4 |
| 5,516,465 A | * | 5/1996 | Yeoman .................... | 261/79.2 |
| 5,573,334 A | * | 11/1996 | Anderson ................. | 366/165.1 |
| 5,605,654 A | * | 2/1997 | Hsieh et al. ............... | 261/79.2 |
| 5,632,933 A | * | 5/1997 | Yeoman et al. ............ | 261/79.2 |
| 6,004,517 A | * | 12/1999 | Tirtowidjojo et al. .... | 366/173.1 |

OTHER PUBLICATIONS

*Microreactors, New Technology for Modern Chemistry*, by W. Ehrfedl, V. Hessel, H. Löwe, Wiley–VCH 2000, pp. 41–85.
*Microreaction technology: industrial prospects; proceedings of the Third International Conference on Microreaction Technology/IMRET2* by T.M. Floyd et al., W. Ehrfeld, Springer 2000, pp. 171–179.

* cited by examiner

*Primary Examiner*—Tony G. Soohoo
(74) *Attorney, Agent, or Firm*—John G. Tolomei; Frank S. Molinaro; Arthur E. Gooding

(57) ABSTRACT

A novel mixing apparatus and process for mixing at least two fluids are disclosed. Excellent mixing and superior pressure drop characteristics are achieved in a device comprising at least two supply channels to feed a mixing chamber and create a vortex. The alignment of the supply channels is such that fluids are introduced into the chamber at both tangential and radial directions. In the case of gas/liquid mixing, particularly advantageous is the injection of the liquid stream tangentially and the gas stream radially. When two liquid streams are mixed, it is desirable to distribute them into fine, interdigitated channels prior to introduction into a supply channel and finally into the chamber. The mixed stream is generally withdrawn from the center of the swirling vortex and in a direction perpendicular to the plane of the vortex.

28 Claims, 5 Drawing Sheets

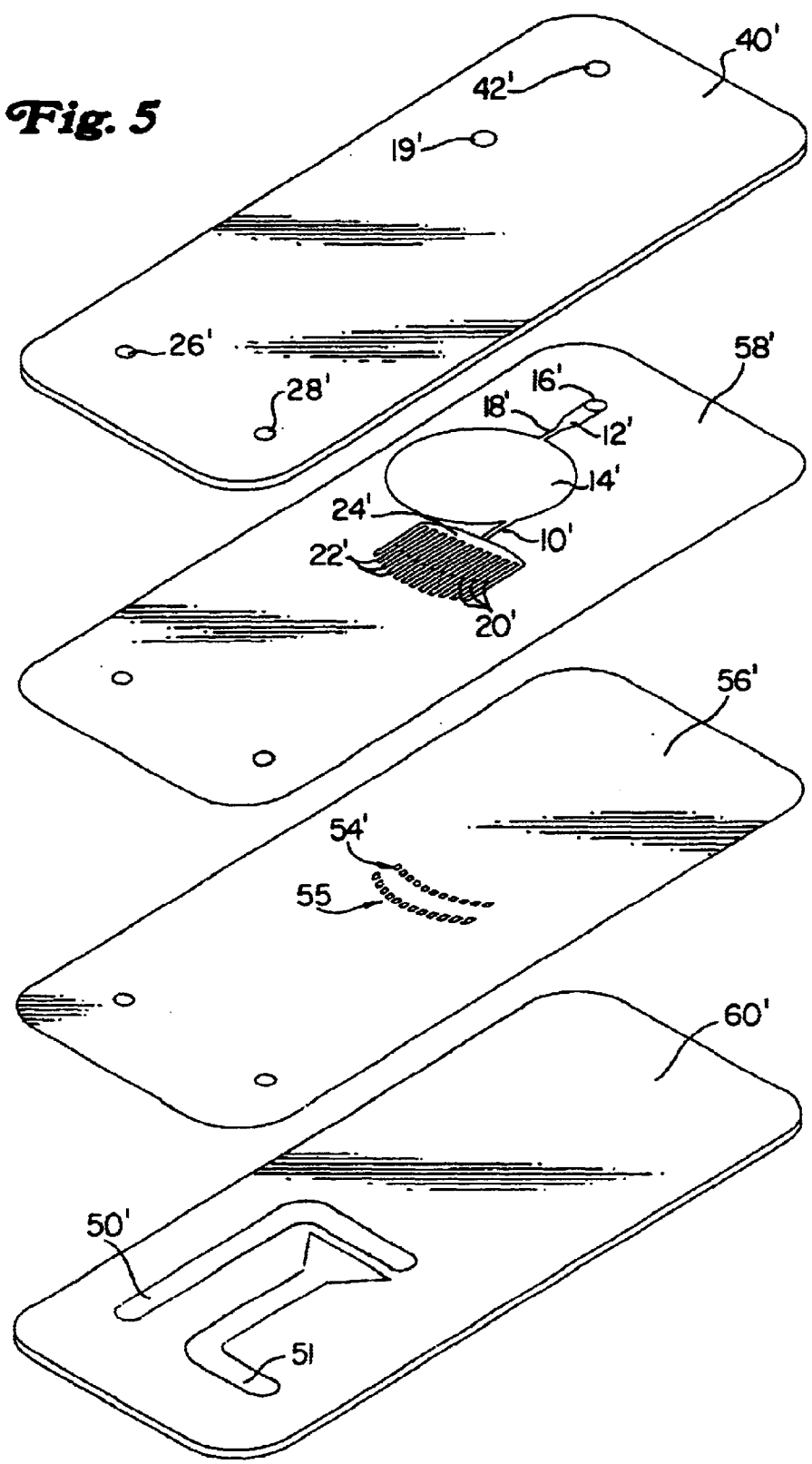

STATIC MIXER AND PROCESS FOR MIXING AT LEAST TWO FLUIDS

FIELD OF THE INVENTION

The present invention relates to a novel mixer and process for mixing at least two fluids. The mixer comprises a mixing chamber, at least two conduits to supply fluids in both tangential and radial directions into the chamber, and a mixing chamber outlet to discharge a stream of mixed fluids.

BACKGROUND OF THE INVENTION

When mixing at least two fluids, the objective is to achieve a uniform distribution as rapidly as possible. It is advantageous to use the static mixers described by W. Ehrfeld, V. Hessel, H. Löwe in *Microreactors, New Technology for Modern Chemistry*, Wiley-VCH 2000, p. 41–85. Known static mixers achieve mixing times for liquids between several milliseconds and 1 second by generating alternate adjacent fluid layers of micrometer range thickness. The higher diffusion constants for gases provide even more rapid mixing. In contrast to dynamic mixers, where turbulent flow conditions prevail, the predetermined geometry of static mixers allows precise fixing of the fluid layer widths-and diffusion paths. As a result, a very close distribution of mixing times is achieved. This allows numerous possibilities for optimizing chemical reactions with regard to selectivity, yield, and even safety.

A further advantage of static mixers is a reduction in component size, allowing greater ease of integration with adjoining equipment, such as heat exchangers and reactors. Process optimization may also be enhanced due to forced interactions between two or more components within a confined space. Static mixers apply to forming not only liquid/liquid and gas/gas mixtures, but also liquid/liquid emulsions and liquid/gas dispersions. Static mixers have also found use in multiphase and phase-transfer reactions.

A static mixer operating using the principle of multilamination or fluid layering has, in one plane, a structure of intermingled channels of a width of about 25–40 microns (i.d., pp. 64–73). The channels divide two fluids to be mixed into a multiplicity of separate fluid streams, arranged to flow parallel and alternately in opposite directions. Adjacent fluid streams are removed vertically upward out of a horizontal plane and through a slot and are brought into contact with one another. Using structuring methods suitable for mass production, however, the channel geometries and therefore the fluid layer widths can be reduced to the submicron range to only a limited extent.

A further reduction in the size of fluid layers using the multilamination principle is achieved by so-called geometric focusing. A static mixer using this principle for reacting hazardous substances is described by T. M. Floyd et al. in *Microreaction technology: industrial prospects; proceedings of the Third International Conference on Microreaction Technology*/IMRET3, W. Ehrfeld, Springer 2000, pp. 171–179. Alternately adjacent channels for the two fluids to be mixed open outward in a semicircle, radially from the outside, into a chamber extending into a funnel shape and merging into a narrow, elongate channel. The layered fluid stream is combined in the chamber and then transferred to the narrow channel, so that the individual fluid layer width is reduced. Under these laminar flow conditions, mixing is purely diffusional. Therefore, mixing times in the millisecond range are achieved by reducing the fluid layer width to the submicron range. A drawback with this configuration is that the narrow channel must be sufficiently long to achieve full, intimate mixing. This requires a large structure and promotes relatively high pressure loss.

In contrast to these disclosures, the present invention provides a solution to the well-known problem of mixing at least two fluids rapidly and uniformly, while at the same time maintaining low pressure drop characteristics and an economical design.

SUMMARY OF THE INVENTION

The present invention is a mixing apparatus and method of mixing that overcome limitations of known mixing operations associated with high pressure drop and insufficient diffusion. Mixing is accomplished by injecting streams of individual fluids in both radial and tangential directions about a mixing chamber to provide an overall helical flow path. Although the invention may be used in a wide variety of applications, the invention is particularly suited for small-scale mixing operations, or micromixing.

In a first embodiment, the present invention is an apparatus for mixing at least two fluid streams, a first fluid stream and a second fluid stream, efficiently and with minimal pressure loss. The apparatus comprises a first supply conduit having a first supply conduit receiving end for receiving the first fluid. The apparatus further comprises a second supply conduit having a second supply conduit receiving end for receiving the second fluid. The apparatus further comprises a mixing chamber in fluid communication with the first and second supply conduits at first and second supply conduit discharge ends opposite the first and second supply conduit receiving ends. One of the first or second supply conduit discharge ends leads substantially tangentially into the mixing chamber and the other of the first or second supply conduit discharge ends leads substantially radially into the mixing chamber. The apparatus further comprises a mixing chamber outlet for discharging a mixed stream of the first and second fluids from the mixing chamber, the mixing chamber outlet in fluid communication with the central region of the mixing chamber.

In a more specific embodiment, the present invention is an apparatus as described in the first embodiment and further comprising a plurality of first fluid distribution conduits for distributing the first fluid stream, a plurality of second fluid distribution conduits for distributing the second fluid stream, and a plurality of supply conduits, each having a receiving end and a discharge end, the receiving ends in alternating fluid communication with the first and second fluid distribution conduits and the discharge ends leading alternately substantially tangentially and substantially radially into the mixing chamber.

In another specific embodiment, the present invention is an apparatus as described in the first embodiment and further comprising a plurality of second fluid distribution conduits for distributing the second fluid stream, a plurality of third fluid distribution conduits for distributing a third fluid stream, and a manifold having an inlet and an outlet, the manifold inlet in fluid communication with the second and third distribution conduits arranged in a repeating sequence, and the manifold outlet in fluid communication with the second supply conduit receiving end.

In another embodiment, the present invention is a layered assembly for mixing at least two fluids. The assembly comprises a substantially planar cover layer having external and internal faces and defining first and second feed channels for receiving first and second fluids into the assembly. The first and second feed channels extend from the external surface to the internal surface to form first and second inlet ports. The assembly further comprises a substantially planar mixing layer having an upper and a lower face, where the mixing layer upper face is sealingly disposed on the cover layer internal face to define a first supply channel having a first supply channel receiving end in fluid communication with the first feed channel and a first supply channel discharge end opposite the first supply channel receiving end. The cover and mixing layers further define a second supply channel having a second supply channel receiving end in fluid communication with the second feed channel and a second supply channel discharge end opposite the second supply channel receiving end. The cover and mixing layers further define a mixing chamber in fluid communication with the first and second supply channel discharge ends, where one of the first or second supply channel discharge ends leads substantially tangentially into the mixing chamber and the other of the first or second supply channel discharge ends leads substantially radially into the mixing chamber. The cover and mixing layers further define a mixing chamber outlet channel in fluid communication with the mixing chamber for discharging a mixed stream of the first and second fluids from the mixing chamber.

In another embodiment, the present invention is a layered assembly as defined above where the cover layer and mixing layer each comprise one or more plates in a fluid-tight stacked arrangement.

In yet another embodiment, the present invention is a process for mixing at least two fluid streams. The process comprises flowing a first fluid stream through a first feed channel and injecting the first fluid stream radially into a mixing chamber. The process further comprises flowing a second fluid stream through a second feed channel, injecting the second fluid stream tangentially into the mixing chamber to create a vortex, and withdrawing a stream of mixed first and second fluids from the central portion of the vortex.

These and other embodiments and objects will become clearer after the detailed description of the invention.

BRIEF DESCRIPTION OF THE DRAWINGS

FIG. 5 depicts a static mixer comprising a stacked plate arrangement with individual plates separated for clarity, where the mixer plate is configured to allow pre-mixing of two fluids in a supply channel prior to injection into the mixing chamber.

DETAILED DESCRIPTION OF THE INVENTION

Figure 1:
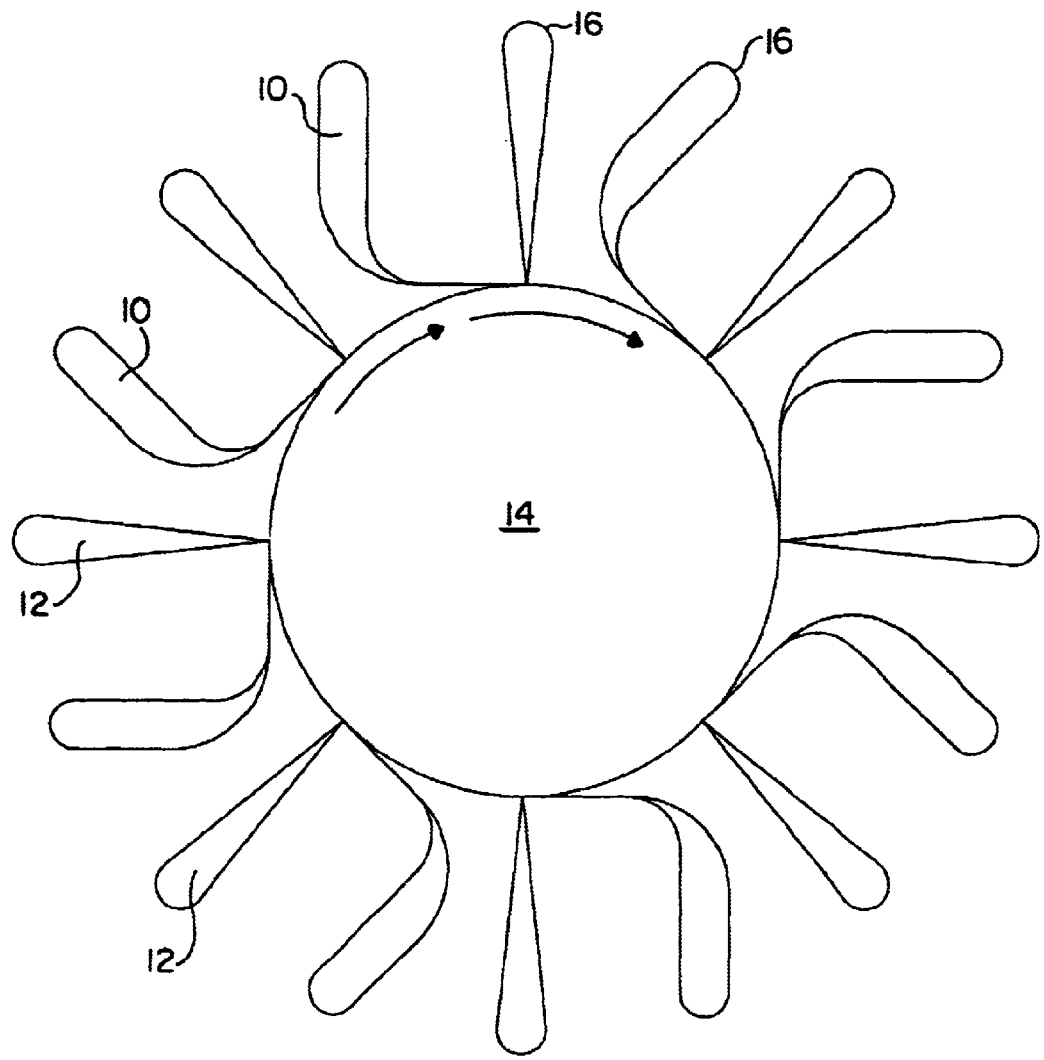
FIG. 1 is a plan view of a mixing chamber with multiple supply conduits leading thereto in alternating tangential and radial directions.

As mentioned, the invention relates to an improved apparatus and method for mixing two or more fluids thoroughly and with minimal pressure drop. The fluids can be broadly any gaseous or liquid substances or mixtures of substances. The fluids may also have solid components dissolved or dispersed therein, so that solutions of dissolved solids and slurries are also applicable to the present invention. Other fluids comprising multiple phases such as gas/liquid mixtures, particle-entrained gases, and three-phase slurries are also pertinent. The mixing achieved according to the present invention also encompasses the known operations of dissolving, emulsifying, and dispersing. Consequently, the resulting mixture includes solutions, liquid/liquid emulsions, and gas/liquid and solid/liquid dispersions. The mixing apparatus and method according to the invention are advantageously applied in forming a gas/liquid dispersion, in which case at least one fluid introduced into a mixing chamber contains a gas or a gas mixture and at least one further fluid introduced contains a liquid, a liquid mixture, a solution, a dispersion, or an emulsion.

The mixing apparatus and method according to the present invention are also suitable for carrying out chemical reactions, especially those characterized as diffusion limited. As described in detail below, the reactant streams may be introduced separately into a mixing chamber or they may be pre-mixed in supply conduits leading to this chamber. The optimal choice depends on the specific nature of the reaction. For example, reactions requiring long residence times may be best effected using pre-mixing, while reactions where explosive mixtures may result locally due to non-uniform mixing are best carried out by avoiding contact between reactants upstream of the mixing chamber. Devices for controlling the chemical reaction, such as for example temperature or pressure sensors, flow meters, heater elements, or heat exchangers, can be integrated with the mixing apparatus. In one embodiment of the mixing apparatus, described later, where the apparatus comprises an assembly of sealingly connected layers, these devices may be arranged at a layer above or below the mixing chamber and may be functionally connected thereto. To carry out heterogeneously catalyzed chemical reactions, the mixing apparatus may additionally contain catalytic material.

Depending on the specific application, including chemical reactions, for which fluid mixing is desired, it may be advantageous for various other fluids to be introduced into the mixing chamber. Such supplemental fluids include, for example, chemical stabilizers, emulsifiers, corrosion inhibitors, reaction promoters, polymerization chain terminating agents, and the like. Of course, the fluids to be mixed may already contain an admixed auxiliary substance of this type. The mixture formed in the mixing chamber is removed via a mixing chamber outlet in fluid communication with the mixing chamber, preferably at its central region.

The mixing apparatus according to the present invention for mixing at least two fluids includes a mixing chamber and at least two supply conduits for injecting the fluids into the chamber and arranged about its perimeter. The supply conduits open into the mixing chamber in such a manner that particular fluids introduced at defined flow rates will form a fluid spiral flowing concentrically inward. This vortex formation extends the fluid residence time within the mixing chamber considerably, thereby improving mixing characteristics. Establishment of the desired helical and inward liquid flow path is primarily a function of both the angle of fluid introduction into the mixing chamber and the fluid kinetic energy. Fluids introduced radially, or, in the case of a cylindrical mixing chamber, directly toward its center, will not assume a helical flow path unless acted upon by another fluid with sufficient kinetic energy in the tangential direction. The present invention achieves exceptional mixing by introducing the first and second fluids to be mixed both tangentially and radially. It is preferred that the tangential fluid kinetic energy components are adequate to bend the radial flow components so that they assume the overall helical flow pattern with a sufficient number of windings to allow effective mixing. Since one fluid is introduced tangentially and another radially, it is preferred that the ratio of fluid kinetic energy of the tangentially flowing fluid to that of the radially flowing is greater than about 0.5 to provide the desired helical and inward flow pattern.

When proper conditions are established to form the desired helical flow pattern, only that fluid flowing along the outermost winding of the helix contacts the lateral inner surface of the mixing chamber. Depending on the shape and dimensions of the mixing chamber, this fluid accounts for a significant fraction of the pressure drop therein due to frictional losses. Fluid comprising the inner windings, in contrast, is in contact on both sides with rotating fluid only. This fluid comprises previous and subsequent windings flowing in the same direction. For these reasons, the pressure loss achieved with the mixing apparatus of the present invention is lower than that possible for a static mixer using multilamination only and with a correspondingly long mixing path. In this case, the fluids flow as alternating layers in opposite directions. Therefore, frictional effects between adjacent fluid streams flowing along straight or curved pathways are larger. The advantages associated with using the apparatus of the present invention for mixing fluids may therefore be realized in terms of a low pressure loss as well as both a large contact area and long residence time available for diffusive mixing within a small structure. While a compact design in the form of a micromixer may be conveniently fabricated, the present invention does not exclude operation at intermediate or even larger scales.

A further advantage associated with the present invention is the contact between one winding of the fluid spiral or vortex and the previous and subsequent windings, contributing to the diffusive mixing. Preferably, laminar flow conditions prevail from the circular fluid motion in the interior of the mixing chamber. However, it is also possible for localized turbulent flow conditions to result from the overall inward flow of the fluid spiral or vortex.

To form an inward helical flow path, at least one of the supply conduits is arranged to open at an acute angle or tangentially into the mixing chamber. Furthermore, the fluids may be introduced either as their bulk composition entering the mixer or as fluid boundary layers that have been pre-mixed to some extent before entering one or more supply channels. Generally, the tangentially directed fluid maintains laminar flow conditions upon entry into the mixing chamber, in order to form the desired fluid vortex with a multiplicity of windings extending perpendicularly with respect to the plane of the vortex.

The supply conduits may be arranged to open out in one plane around the common mixing chamber. Without regard to the number of supply conduits used, a minimum of two being required, the supply conduits are preferably distributed symmetrically around the circumference of the mixing chamber. These supply conduits can be used to supply the same fluids, for example the fluid A may be supplied separately in each of supply conduits 1 and 3, while fluid B is supplied in conduits 2 and 4. Otherwise, each conduit can supply a different fluid, for example conduits 1, 2, 3, and 4 can supply the fluids A, B, C, and D, respectively. Furthermore, the supply channels can be arranged in a plurality of planes around the mixing chamber. The same or different fluids can be introduced into the mixing chamber at supply channels arranged in any given plane. Therefore, fluids may be introduced into a common type of mixing chamber, for example one having a circular cross section in a horizontal plane, through supply channels at various axial heights about the mixing chamber. Such a design could achieve an even longer fluid spiral, corresponding to longer residence times within the mixing chamber.

The mixing chamber is preferably substantially cylindrical in shape and therefore preferably has a substantially circular cross section. This cross section is advantageously fixed in a substantially horizontal plane from which the mixing chamber outlet leads substantially perpendicularly or in a general vertical direction. Of course, the mixing chamber may have another cross sectional shape, particularly a rounded form such an oval or ellipse. Even forms such as a triangle or other polygons may be acceptable if the corners normally formed at their vertices are rounded. The rounded or curved form prevents dead water zones (i.e. regions without a constant flow) that could be problematic if corners or edges are present. In the preferred case of a cylindrically shaped mixing chamber, the height of the supply conduits, at least in the region where they open into the mixing chamber, is preferably less than or equal to the height of the mixing chamber.

In a preferred design, multiple supply channels alternately open tangentially and radially into the mixing chamber. This particular embodiment of the mixing apparatus is especially useful for providing gas/liquid dispersions. Here, supply channels for the liquid streams optimally open into the mixing chamber at a more acute angle than those for the gas streams. As a result, the gas streams are broken into individual gas bubbles by the swirling liquids. Particularly preferably, supply channels for the liquids open tangentially into the mixing chamber, and the supply channels for the gases open radially into the mixing chamber. This arrangement promotes the formation of gas/liquid dispersions with a small, closely distributed bubble size.

The mixing apparatus comprises a mixing chamber outlet that supplies the stream of mixed fluids for downstream applications. The mixing chamber outlet is in fluid communication with, and withdraws mixed fluid from, the central region of the mixing chamber, preferably at its center point. For example, if the mixing chamber is cylindrical and therefore has a circular cross section, the mixing chamber outlet will extract mixed fluid from its center. In a preferred embodiment, the mixing chamber has a substantially circular cross section oriented horizontally and the mixing chamber outlet leads substantially perpendicularly, either upward or downward, therefrom. The cross-sectional area of the outlet compared to that of both the mixing chamber and the cross-sectional areas of the supply channels opening into it will be set, in view of the specific fluids and their properties, to allow the formation of the desired inwardly flowing fluid vortex with a multiplicity of windings. Preferably, the mixing chamber outlet conduit has a circular cross section, as would be the case for a pipe or tube, and the ratio of the diameters of the mixing chamber and mixing chamber outlet is greater than about 5.

In another process embodiment, one or more additional fluids enter into the mixing chamber either through a separate supply conduit or through a supply conduit where the additional fluid is pre-mixed with one of the fluids to be mixed. Such additional fluids may contain an auxiliary substance that stabilizes the mixture, for example an emulsifier. If further supply channels are used to supply such a substance, they advantageously open tangentially into the mixing chamber, so that there is in each case one stream of the additional fluid between adjacent windings of the fluid spiral. Otherwise, if further supply channels are used to supply a gaseous component into a fluid vortex which contains at least one liquid in the mixing chamber, these supply channels for the gas advantageously open into the mixing chamber radially or at an intermediate angle between tangentially and radially. As a result, the gas that is supplied is broken up into small gas bubbles by the fluid spiral and is finely dispersed.

As mentioned previously, surprisingly good mixing characteristics are obtained when at least one of the supply conduits provides a substantially tangential injection of fluid into the mixing chamber and at least one also provides a substantially radial injection. It is the tangential fluid motion that imparts a spiral or vortex formation within the chamber, which breaks apart or finely divides the radially flowing fluid. By radial flow is meant a fluid flow directed toward the center of the mixing chamber, whether the chamber be circular, elliptical, or oval in shape. Tangential flow refers to a flow directed at a right angle to this radial flow and generally at or near the surface of the mixing chamber. Substantially tangential or radial flow means that the superior mixing characteristics of the present invention may also be obtained when the flows are not exactly tangentially or radially directed, but are within about 30° of these directions.

In a preferred embodiment, the apparatus comprises not merely two, but a plurality of supply conduits leading alternately substantially tangentially and substantially radially into the mixing chamber. The term "alternately" refers to the tangentially directed supply conduits, designated T, and the radially directed supply conduits, designated R, lying in the order TRTR in at least one plane about the mixing chamber. The supply channels may also lie alternately in more than one plane, for example they may be offset in the manner of a chess board in two dimensions about the circumference and length of the mixing chamber. By varying the positions, in both the horizontal and vertical planes, from which fluids are introduced into the mixing chamber, multiple helical flow paths may be formed, flowing concentrically inward. Thus, for example, a type of double or even triple spiral may be effected. These fluid spirals lie together in one plane and around one center, in such a manner that the respective windings lie adjacent to one another.

Furthermore, not only are the supply conduits arranged in alternating tangential and radial directions about the mixing chamber, but they are also preferably in alternating fluid communication with respect to the first and second fluids to be mixed. In the case of mixing a gas stream with a liquid stream, which may be desired, for example, to effect a chemical reaction, exceptional results in terms of mixing have been achieved where the gas and liquid streams are injected tangentially and radially, respectively, into the mixing chamber. Without adherence to any particular mechanism or theory, it is believed that the tangentially directed liquid breaks the radially flowing gas stream into fine bubbles upon entry into the mixing chamber. As mentioned previously, it is preferable that the kinetic energy of the tangentially introduced fluid is at least 0.5 times that of the radially introduced fluid. This ensures the overall formation of an inwardly flowing spiral or vortex to provide a sufficient residence time for effective mixing.

It is important to note that it is not necessary for entire supply conduits to be oriented in these directions, only those portions in proximate fluid communication with the mixing chamber and impacting the fluid direction into the chamber. For this reason, it is appropriate to refer to the supply conduits as having respective receiving and discharge ends. The receiving ends are in fluid communication with the fluids to be mixed, or feeds, and the discharge ends are in fluid communication with the mixing chamber and are responsible for directing the fluid flow with respect thereto. In one possible design, the supply channels may be of substantially uniform cross section over their entire length from their receiving end to their discharge end. A substantial change in direction from the receiving end to the discharge end of a supply conduit is certainly possible and may even be desired if space about the mixing chamber for multiple conduits is limited. Otherwise, acceleration of the fluid into the mixing chamber, which is often desired to improve mixing, is conveniently accomplished through the narrowing of a supply conduit in the direction from its receiving end to its discharge end. Particular design alternatives for supply conduits that narrow in this manner include those having the shapes of funnels, drops, or triangles.

In another preferred embodiment, the first and second fluids may be mixed prior to their injection into the mixing chamber (i.e. pre-mixed). In this case, the mixing apparatus may further comprise the necessary elements to accomplish such mixing within the supply channels. For supply channels used to carry out this pre-mixing, the supply channels should be sufficiently long to provide good pre-mixing without being so long as to promote excessive pressure drop. One particular method involves the use of distributing manifolds, so that the streams to be pre-mixed in the supply channels are first divided among a plurality of smaller streams flowing through distribution conduits. These smaller streams of the feed or starting fluids may then be directed at various points, preferably in an arrangement of a repeating or interdigitated sequence, into the supply conduit inlets. By a "repeating sequence" is meant, in the case of two fluids A, B, that fluid streams lie next to one another in a recurring pattern at least one plane. An alternating order of ABAB, for example, is a repeating sequence. Certainly, other repeating sequences are possible, for example AABAAB. Furthermore, the same principals may be used for pre-mixing more than two fluid streams. For example, in the case of three fluids A, B, C, being mixed in a supply channel, the term "repeating sequence" would also encompass many possible orders of individual fluid boundary layers, such as ABCABC or ABACABAC. The fluid layers or distribution conduits from which they are formed may also lie in a repeating sequence in more than one plane. For example, they may be offset in the manner of a chess board in two dimensions. The fluid streams and conduits associated with the different fluids are preferably arranged parallel to one another and in the same direction.

In using a pre-mixing operation as described above to mix two or more streams prior to introduction into the mixing chamber, the fluids to be pre-mixed are divided among a plurality of smaller distribution streams that are then alternately layered or arranged in a repeating sequence before being fed into a supply conduit. Since the supply conduit generally has a significantly smaller cross sectional area than the sum of the cross sectional areas of the individual distribution streams feeding thereto, the pre-mixed stream can be referred to as "focused" prior to introduction into the mixing chamber. This focusing increases the flow velocity of the divided streams and reduces their layer thickness, promoting the formation in the mixing chamber of an inwardly flowing spiral with as many windings as possible.

Preferably, the ratio of the sum of the cross sectional areas of the distribution conduits to the cross sectional area of the supply conduit into which they are merged at its receiving end is from about 1.5 to about 500. When two or more fluids are pre-mixed in this manner, it is preferable that the manifold used for receiving the arranged fluid streams and discharging them into a single conduit (i.e. a supply conduit) have a curved surface where it connects with the supply conduit. To provide optimal mixing characteristics with minimal pressure drop in cases where pre-mixing is used, it is preferred that, with respect to the entire supply conduits, the length to width ratio, assuming a constant cross-sectional geometry, is from about 1 to about 30. Where the supply conduit cross section varies, for example when the supply conduit narrows near the mixing chamber, this ratio applies insofar as it relates to the width of the supply conduit discharge end in fluid communication with the mixing chamber.

As described previously, a fluid spiral is formed that flows concentrically inward, and the resulting mixture is then removed from the center of the fluid vortex. In a specific preferred embodiment where premixing is used, three fluids are mixed using the apparatus of the present invention, with the second and third fluids being premixed upstream of the second supply conduit. In this embodiment, the apparatus comprises a plurality of second distribution conduits and a plurality of third distribution conduits dividing, respectively, the second and third fluids. As explained above, a manifold can be used to receive the second and third fluid distribution conduits arranged in a repeating sequence to force individual boundary layers of the second and third fluid streams in close proximity in the second supply conduit prior to injection into the mixing chamber. The first fluid can be fed into the mixing chamber without mixing through a first supply conduit. This particular embodiment is especially advantageous when the second and third fluids are liquids, injected tangentially, and the first fluid is a gas, injected radially, into the mixing chamber.

A specific type of mixer that accomplishes the excellent mixing characteristics in accordance with the broadly defined apparatus described above comprises at least two substantially planar layers joined together sealingly, or in a fluid-tight manner. In such an apparatus, the conduits, mixing chamber, and other fluid-guiding structures, are defined by the sealing connections established between adjacent layers. For example, the layers may be formed as plates having recesses or apertures impressed into, or cut completely away from, the plates. When joined together in a fluid-tight arrangement, adjacent plates will surround these recesses and apertures to form structures, such a channels, capable of containing fluid streams under pressure. Some structures, for example the mixing chamber, may be defined completely by a sealing connection between two or more plates, depending on the plate thickness and the chamber height. If the mixing chamber is merely impressed into, but not completely cut away from, one side or face of a single plate, then the mixing chamber outlet structure may also be included in the same plate, extending from the mixing chamber to the opposite face of the plate into which the mixing chamber is impressed. If the mixing chamber is completely cut out of a plate, the mixing chamber outlet structure will require the use of at least one other plate joined in a sealing connection. Some structures such as feed conduits may pass completely through two or more plates.

Regardless of the number of individual plates used for any given configuration, the mixing apparatus in one embodiment of the present invention comprises at least two discreet layers, characterized by their function. Specific functions that occur at various substantially planar layers include distributing, channeling, and mixing the feed components. In the specific case where plates are used to form the apparatus, individual layers may comprise more than one plate, or, with certain specialized molding techniques, possibly more than one function or layer may be present in the form of a single plate.

The first layer is a substantially planar cover layer used to supply the external fluid streams to be mixed to the internal structures of the mixing apparatus. The cover layer has both external and internal faces and defines first and second feed channels for receiving first and second fluids into the assembly. These first and second feed channels extend from the external surface to the internal surface to form first and second inlet ports. The second layer is a substantially planar mixing layer having an upper and a lower face, where the mixing layer upper face is sealingly disposed on the cover layer internal face. The fluid-tight connection between the layers defines a first supply channel having a first supply channel receiving end in fluid communication with the first feed channel and a first supply channel discharge end opposite the first supply channel receiving end. Also defined by the sealed connection between the cover and mixing layers is a second supply channel having a second supply channel receiving end in fluid communication with the second feed channel and a second supply channel discharge end opposite the second supply channel receiving end. Further defined by this connection is a mixing chamber in fluid communication with the first and second supply channel discharge ends, where one of the first or second supply channel discharge ends leads substantially tangentially into the mixing chamber and the other of the first or second supply channel discharge ends leads substantially radially into the mixing chamber. The connection between the two layers also defines a mixing chamber outlet channel in fluid communication with the mixing chamber for discharging a mixed stream of the first and second fluids from the mixing chamber.

In the layered configuration, structures are formed from connecting two or more plates. Recesses, such as grooves or blind holes, are typical structures that are surrounded by material in one plane and perpendicularly to this plane. Structures defining channels such as fluid supply channels may be formed as slots extending in depth either partially or completely through a plate. Apertures, such as slots or holes, by contrast, pass through the material, i.e. are only laterally surrounded by the material in one plane. The open structures formed by the recesses and apertures, as a result of stacking with other layers, form fluid-guiding structures, such as supply channels, mixing chambers or feeds. A cover layer and/or base layer closing off the layered assembly in a fluid-tight manner with respect to the outside defines feed channels, which may be apertures or grooves, for the fluids to be mixed and/or at least one outlet for the mixture which is formed.

When the layered assembly comprises stacked plates, they should be made from a material that is sufficiently inert with respect to the process fluids to be mixed. This will help avoid corrosion, erosion, deformation, cracking, or expansion/contraction of the plates, or other detrimental effects potentially resulting from exposure to the fluids under processing conditions. Preferably, inert materials from which the mixer is constructed are selected from the group consisting of polymers (e.g. plastics such as polyvinylchloride or polyethylene), metals, alloys, glass, quartz, ceramic, and semiconductor materials. The same or different materials may be used for the various plates, depending on the properties desired at different stages or mixing and/or reaction. Optionally, at least the cover plate, channel plate, distributor plate, and mixer plate are formed from a transparent material, especially glass or quartz glass, to allow convenient observation of the mixing operation. For use of the mixer for small-scale operations, the plates preferably have a thickness in the range from about 10 microns to about 5 millimeters. Of course, thicker plates may be more appropriate for forming the mixing chamber. Otherwise, two or more plates may be used to form the chamber or an elongated channel. Suitable methods for connecting the plates to one another in a fluid-tight manner include, for example, pressing, welding, sealing, adhesive bonding, or anodic bonding. Suitable methods for structuring the plates include known precision mechanics and micromechanics production methods, such as for example laser ablation, spark erosion, injection molding, stamping, or electrodeposition. Other standard industrial methods, which comprise at least the steps of structuring using high-energy radiation and electrodeposition, as well as, if appropriate, molding, are also suitable.

In the specific embodiment of the invention where the static mixer is formed as a stacked plate arrangement, the conduit structures are generally formed as channels in the plates. The open structures of the supply channels and the mixing chamber are defined by at least one plate serving as a mixer plate. These open structures are closed off by a cover plate connected in a fluid-tight manner to the mixer plate, where the cover plate defines feed channels for receiving the fluids to be mixed from sources upstream of the mixer. Likewise, open structures defined by various other plates described later are closed off when engaged in a sealing connection with at least one other adjacent plate. It is also possible, but not necessary, for the cover plate to define a channel, namely the mixing chamber outlet channel, for discharging the mixed fluids. Alternately, if additional plates are used, these plates, rather than the cover plate, may define the feed channels and/or mixing chamber outlet channel. Since the plates themselves are most conveniently fabricated to a constant thickness or depth, it is advantageous if the supply channels and/or the mixing chamber defined by these plates are also of the same depth.

As noted in the general apparatus description, the supply channels may be of uniform cross section or they may narrow in the direction leading to the mixing chamber (i.e. from their respective receiving ends to their discharge ends). Whether the supply channels narrow or maintain substantially constant cross sectional areas, it is preferred that the ratio of the width of the supply channels, as measured at their respective points opening into the mixing chamber, to the width of the mixing chamber in the plane of the fluid spiral that forms during operation is advantageously less than or equal to 1:10. Stated otherwise, for a mixing chamber that is substantially cylindrical in shape or otherwise has a substantially circular cross section, the ratio of the diameter of the mixing chamber to the width of each supply channel discharge end is greater than about 10.

In accordance with the general description and function of the apparatus as set forth previously, the mixer plate may also define the open structures of a plurality of supply channels, each in alternate tangential/radial fluid communication with the mixing chamber. In this particular case, the use of further plates, such as a channeling plate and a distributor plate, can direct the first and second fluids alternately to the supply channels. The channeling plate is connected to the mixer plate at one face and defines open structures of a plurality of first and second distribution ports, each in fluid communication at one end, respectively, with first and second fluid distributing structures defined by the distributor plate. The distributor plate is connected to the face of the channeling plate that is not connected to the mixer plate, and the first and second distributing structures are in fluid communication, respectively, with the first and second feed channels. The ends of the first and second distribution ports not in fluid communication with the fluid distributing structures are then each separately in fluid communication with the supply channels of the mixer plate to provide spatially alternating injection of the first and second fluids about the mixing chamber.

Furthermore, it is also certainly possible to use the channeling and distributor plates for other types of functions. For example, according to the broadly defined apparatus above, two fluid streams may be pre-mixed upstream of a supply channel before introduction into the mixing chamber with a third feed. In this case, if the fluid streams to be pre-mixed are referred to as the second and third fluids, the channeling plate will define open structures of a plurality of second and third distribution ports in fluid communication with their respective fluid distributing structures. The distribution ports may advantageously form a row of apertures for each of the second and third fluids to be supplied, with each aperture being precisely assigned to one supply channel. Thus, in the case of pre-mixing described here, the apertures are each alternately used to supply the second and third fluids, through a common supply channel, to the mixing chamber.

Additionally, the mixer plate will now further define the open structure of a focusing chamber to accept alternating divided streams of the first and second fluids and combine them into a single supply channel. In many respects, the focusing chamber serves a function similar to that of the manifold described in the general apparatus of the present invention. The first fluid may be introduced into the mixing chamber through a separate supply channel used for the first fluid only, or it may also be mixed with either of the other two fluids. Therefore, while the embodiments described above represent preferred mixers and methods of mixing, there exist practically a limitless number of variations where several or a large number of streams may be mixed according to the present invention, with or without pre-mixing of the fluids in the supply channels. Furthermore, the plates may be arranged in various orders to promote different types of mixing operations. For example, it is preferable to use a distributor plate, as described above, when the mixing operation incorporates multiple supply channels or a pre-mixing of feed streams. This distributor plate may be located between the cover plate and mixer plate or below the mixer plate. Also, with proper fluid guiding structures, it is not necessary that the channeling plate lie between the mixer plate and the distributor plate. Rather, the channeling plate may lie either above or below these plates as desired.

The elements of the present invention have now been described with reference to both a mixing apparatus and process. Depending on the specific application and process conditions, the present invention may adopt any of a number of combinations of the elements and features described herein without departing from the spirit and scope of the invention. Specific preferred embodiments of the present invention will now be described with reference to the drawings. These embodiments are to further clarify the invention and not meant to pose any undue limitations on the generally broad scope of the invention as set forth in the appended claims. Analogous features of the invention, as represented in two or more drawings, are labeled using the same numbers, but are also designated with a prime (').

FIG. 1 depicts a plan view of a preferred mixing chamber 14, having tangential 10 and radial 12 supply conduits connected thereto. The tangentially directed conduits 10 impart a swirling or helical motion to the fluid that is necessary to establish the proper residence time and mixing. The kinetic energy of the tangentially introduced fluid should be great enough relative to that of the radially introduced fluid to convert the path of the latter fluid from directly toward the mixing chamber outlet (not shown) at the center of the mixing chamber 14 to a helical path. Preferably, in order to effect this motion, the kinetic energy of the tangentially flowing fluid is at least 0.5 times that of the radially flowing fluid. Therefore, it is preferable that, when the embodiment of FIG. 1 is used for liquid/gas mixing, the gas is introduced radially and the liquid tangentially into the mixing chamber, since the kinetic energy of the flowing liquid will normally be substantially greater than that of the gas.

The initially radially directed fluid may or may not be bent into a path as tightly wound as the tangentially directed. fluid, depending on the relative kinetic energies of the two fluids. That is, the initially radially directed fluid may have as many windings along its path toward the mixing chamber outlet as the tangentially directed fluid or it may have fewer windings.

In most cases, the tangentially directed conduits will be reserved for a first fluid and the radially directed conduits for a second fluid. Therefore, the first fluid would be distributed, using a plurality of first fluid distribution conduits (not shown), to each of the tangentially directed supply conduits 10. Likewise, the second fluid would be distributed, using a plurality of second fluid distribution conduits (not shown), to each of the radially directed supply conduits 12. The designation of a conduit as tangentially or radially directed is based on the orientation of the conduit discharge ends 18 leading into the supply chamber.

Both the tangentially directed supply conduits 10 and the radially directed supply conduits 12 are depicted as having closed ends in the plan view. Thus, the fluids feeding these supply conduits at their respective receiving ends 16 enter either above or below the cross section depicted. It is, of course, possible that the supply conduits are fed through conduits within the same plane (as well as the same plate).

Figure 2:
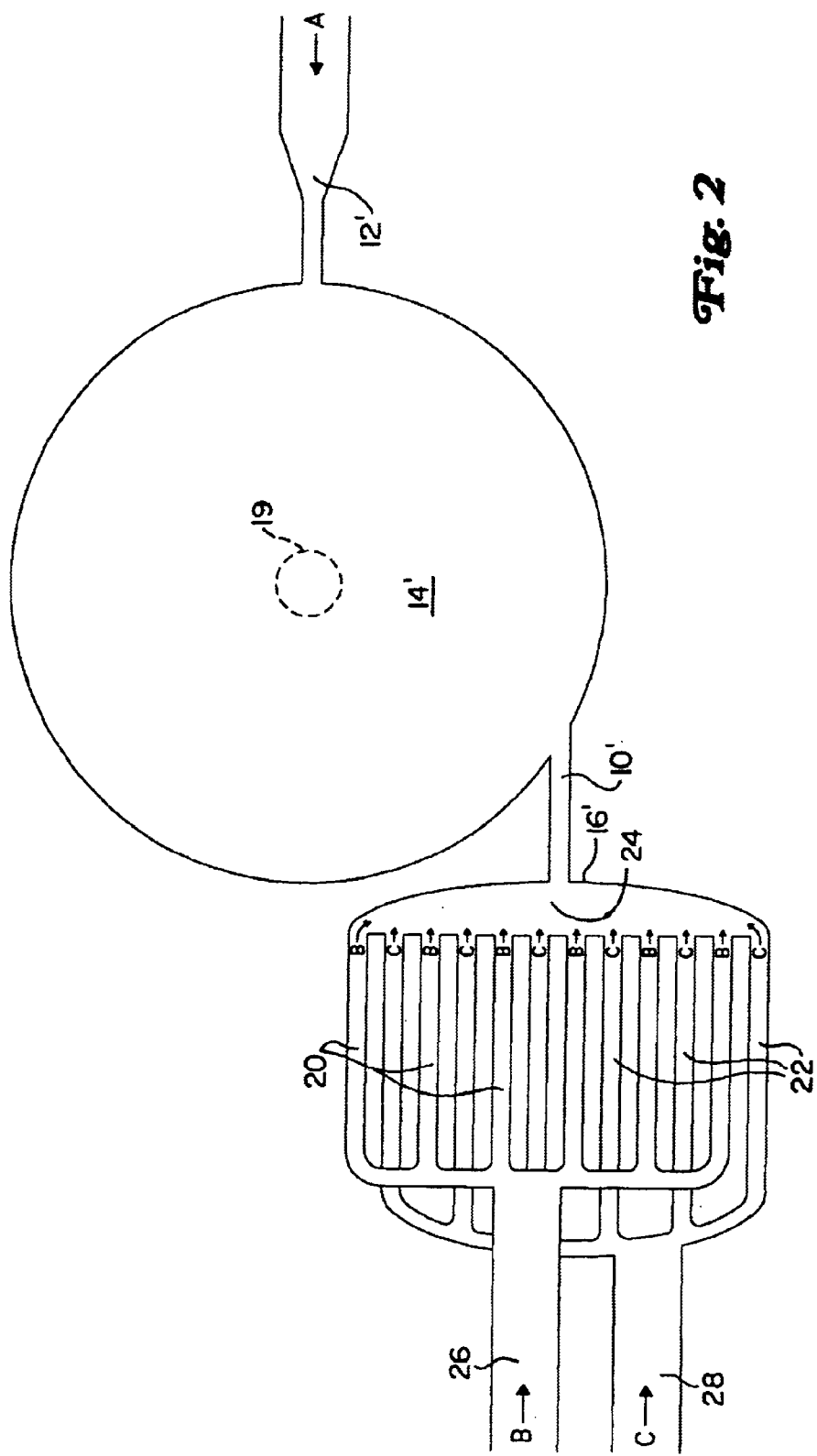
FIG. 2 is a plan view showing the pre-mixing of two fluids in a supply conduit prior to injection into the mixing chamber.

FIG. 2 depicts an embodiment of the invention where a tangentially directed supply conduit 10' is fed through two feed conduits 26, 28 in the same plane as the mixing chamber 14'. As in FIG. 1, the mixing apparatus comprises a radially directed supply conduit 12' that is also in fluid communication with the mixing chamber 14'. In this embodiment, the radially directed supply conduit 12' may be used to supply a first fluid A to the mixing chamber, while the tangentially directed supply conduit 10' may be used to supply a mixed stream of second B and third C fluids. The second B and third C fluid streams are each distributed into a number of smaller streams using a plurality of second 20 and third 22 fluid distribution conduits. These distribution conduits are interdigitated at the inlet of a manifold 24 to provide pre-mixing of the second B and third C fluids upstream of their respective, tangentially directed supply conduit 10'. While the inlet of the manifold 24 is in fluid communication with the second 20 and third 22 distribution conduits, the outlet is in fluid communication with only the supply conduit 10' at its receiving end 16', which is the end not in fluid communication with the mixing chamber 14'. A mixing chamber outlet 19 extends either above or below the plane of the cross section of the mixing chamber 14' to withdraw a stream of the mixed fluids.

According to FIG. 2, the supply conduit 10' for supplying the mixed fluid stream to the mixing chamber 14' is narrower than either of the conduits 26, 28 used for supplying the second B and third C fluids to be mixed. Also depicted in FIG. 2 is a tangentially directed supply conduit 10' that is smaller in width than the sum of the widths of the distribution conduits 20, 22 leading to the inlet of the manifold 24. Of course, the fluid velocity entering the mixing chamber is inversely proportional to the area of the supply conduit opening thereto. Using narrow supply channels, or narrowing the supply conduit in the direction leading to the mixing chamber 14', as shown for the radially directed supply conduit 12', accelerates the fluid velocity into the mixing chamber 14' and generally improves mixing characteristics.

Figure 3:
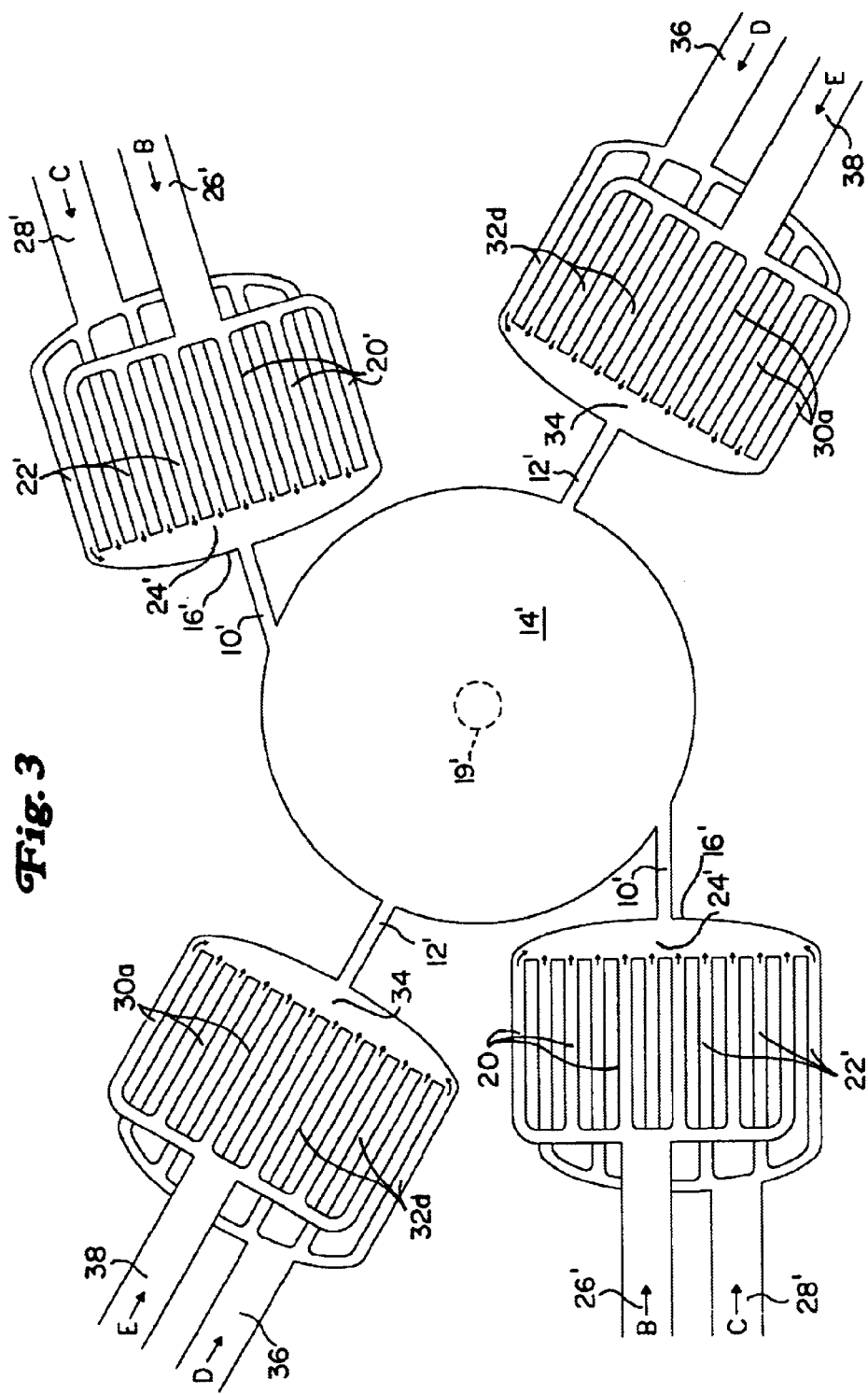
FIG. 3 is a plan view showing multiple supply conduits where two fluids are mixed and where the supply conduits alternate between tangential and radial directions about the mixing chamber.

FIG. 3 shows a further embodiment, where fluid entering the mixing chamber 14' through the radially directed conduit 12' has been premixed in a similar manner to fluid entering through the tangentially directed conduit 10'. In this case, a plurality of distribution conduits 30 in fluid communication with fourth fluid D and also a plurality of distribution conduits 32 in fluid communication with a fifth fluid E are each used to divide these fluids among smaller streams. These streams are then distributed in an interdigitated arrangement to the inlet of a second manifold 34 leading to the radially directed supply conduit 12'. Again, as in FIG. 2, the velocities of the fluids, as seen from the relatively narrow tangentially and radially directed supply conduits 10', 12' compared to their respective feed conduits 26', 28', 36, 38, are increased prior to their introduction into the mixing chamber. Again, a mixing chamber outlet 19' extends either above or below the cross section of the mixing chamber to withdraw a stream of mixed fluids.

Figure 4:
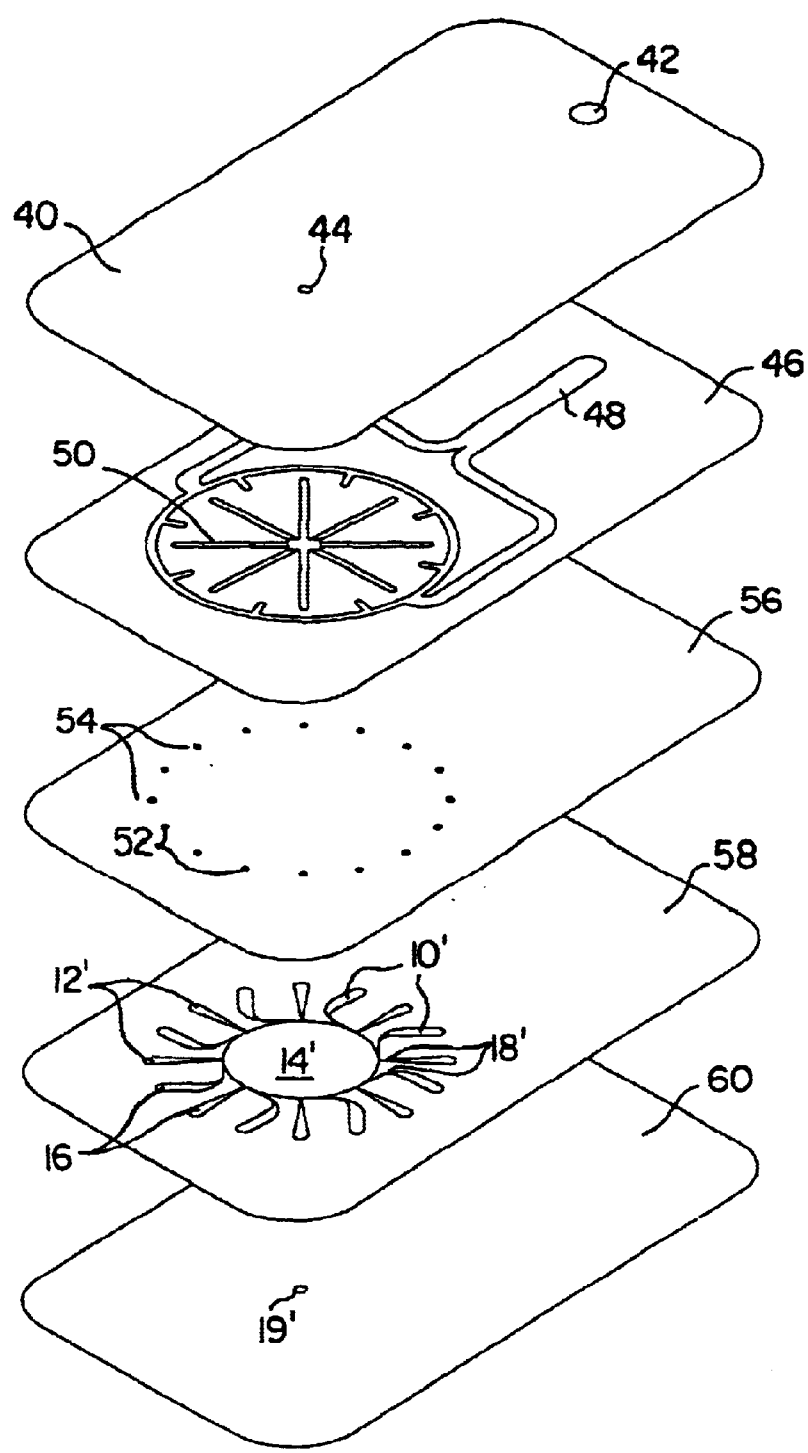
FIG. 4 depicts a static mixer comprising a stacked plate arrangement with individual plates separated for clarity, where a mixer plate defines a mixing chamber with multiple supply channels leading thereto in alternating tangential and radial directions.

FIG. 4 illustrates a stacked plate apparatus for mixing fluids in a manner consistent with the apparatus of FIG. 1. A plurality of both tangentially 10' and radially 12' directed conduits are in alternating fluid communication with both the mixing chamber 14' and with two separate fluid streams, so that one fluid is introduced exclusively tangentially and the other exclusively radially into the mixing chamber. FIG. 4 illustrates a specific type of static mixer comprising a fluid tight plate stack, where the plates are shown separately for ease of understanding. In this arrangement, a cover plate 40 or layer that defines the open structures of feed channels 42, 44 for receiving each fluid individually. The channels in this case are in the form of holes extending through the cover plate 40 and providing fluid communication of the individual fluids with the plate below, namely the distributor plate 46.

The distributor plate 46 or layer defines the open structures of first 48 and second fluid 50 distributing structures in exclusive fluid communication with their respective feed channels 42, 44. These fluid distributing structures 48, 50 extend through the distributor plate 46 and provide alternate fluid communication of the first and second fluids at discrete points with a plurality of both first 52 and second 54 distribution ports. The open structures of these fluid distribution ports 52, 54 are defined by a channeling plate 56 or layer that is connected at one face directly below the distributor plate 46. The fluid distribution ports 52, 54, according to this illustration, are holes extending through the channeling plate 56. Thus, the fluid distribution ports 52, 54 are each in alternating fluid communication with the first 48 and second 50 fluid distributing structures at one end and, at their opposite ends, are also each in alternate fluid communication with tangentially 10' and radially 12' directed supply channels. Specifically, the fluid distribution ports 52, 54 are in fluid communication with the supply channels 10', 12' at their respective receiving ends 16'.

As in FIG. 1, the discharge ends 18' of the tangentially and radially directed supply channels 10', 12' are in fluid communication with a mixing chamber 14' to introduce streams of the first and second fluids thereto. The structures of the mixing chamber 14' and the plurality of supply channels 10', 12' each having a receiving end 16' and a discharge end 18', are defined by a mixer plate 58, connected at its upper face to the lower face of the channeling plate 56. The discharge ends 18' of the supply channels 10', 12' lead alternately tangentially and radially into the mixing chamber 14'. Finally, a mixing chamber outlet 19' is in fluid communication with the central region of the mixing chamber 14' and extends perpendicularly from the mixer plate 58 to allow discharge of the mixed fluid stream. The mixing chamber outlet 19' in this embodiment is a hole extending through a further plate, namely a base plate 60, that is connected at its top face with the bottom face of the mixer plate 58. The feed channels 42, 44 as well as the mixing chamber outlet 19' may be threaded to allow connections between further conduits and equipment within an overall processing scheme. They may also be otherwise adapted for use with various fittings or attached thereto by bonding, brazing, or other known means.

FIG. 4 illustrates the use of both a mixer plate 58 and a base plate 60, for the case where the mixing chamber 14' and supply channels 10', 12' extend completely through the mixer plate 58. It is also possible to construct the assembly of FIG. 4 by impressing or etching the structures of the mixing chamber 58 and supply channels 10', 12' into the mixer plate so that only the mixing chamber outlet 19' extends through to the opposite side of the mixer plate 58. Therefore, if the stacked plate arrangement is considered in broader terms as a layered assembly with each layer characterized by a separate function, the mixing layer as shown in FIG. 4 comprises both the mixer plate 58 and the base plate 60. However, by impressing the mixing chamber 14' and supply channels 10', 12' into the mixer plate 58, it is certainly possible that the mixing layer may comprise only a single plate. Likewise, it is possible to form other layers using one or more plates, or even have a single plate perform the functions of more than one layer.

FIG. 5 illustrates another stacked plate static mixer, allowing fluid mixing consistent with the manner according to the apparatus of FIG. 2. Tangentially 10' and radially 12' directed supply channels lead into the mixing chamber 14', communicating therewith through the discharge ends 18' of the supply channels 10', 12'. In FIG. 5, a first fluid feed channel 42' is in fluid communication with the receiving end 16' of the radially directed supply channel 12', which narrows in the direction leading to the mixing chamber 14'. A cover plate 40' defines not only the open structure of this first feed channel 42', but also that of second 26' and third 28' feed channels for receiving second and third fluids to be mixed. The cover plate also defines the mixing chamber outlet channel 19' extending perpendicularly and upward from the plane defining the mixing chamber cross section. The mixing chamber outlet channel 19' is in fluid communication with the central region of the mixing chamber to discharge a mixed stream of fluids.

Connected directly below the cover plate 40' at its lower face is a mixer plate 58' defining the open structures of the mixing chamber 14', the tangentially directed supply channel 10', and a radially directed supply channel 12'. Each of these supply channels has a receiving end 16' and a discharge end 18' opposite thereto. The orientation of a particular supply channel discharge end 18', which is in fluid communication with the mixing chamber 14', determines whether that supply channel is tangentially or radially directed. The mixer plate 58' further defines the open structure of a focusing chamber 24' having an inlet and an outlet, where the focusing chamber inlet is in fluid communication with both a plurality of second fluid distribution channels 20' and a plurality of third fluid distribution channels 22' arranged in an interdigitated sequence. The focusing chamber outlet is in fluid communication with the receiving end of the tangentially directed supply channel 10'.

Connected directly below the mixer plate 58' at its lower face is a channeling plate defining a plurality of second distribution ports 54' and also plurality of third distribution ports 55. One end of each of the second distribution ports 54' is in fluid communication with a second fluid distributing structure 50'. The opposite end of each of the second distribution ports is in fluid communication with the second distribution channels 20' leading to the focusing chamber 24'. Likewise, one end of each of the third distribution ports 55 is in fluid communication with a third fluid distributing structure 51. The opposite end of each of the third distribution ports 55 is in fluid communication with the third distribution channels 22' leading to the focusing chamber 24'. This arrangement allows pre-mixing of the second and third fluids prior to introduction into the mixing chamber 14', as well as an increase in the fluid velocity of the second and third fluids after mixing.

Finally, the static mixer comprises a base plate 60' defining the open structures of the second and third fluid distributing structures 50', 51 in fluid communication with the second and third fluid feed channels 26', 28', respectively. These feed channels 26', 28', in contrast to those of FIG. 4, extend through more than a single plate, and in fact they penetrate the mixer plate 58' and channeling plate 56' in addition to the cover plate 40'. The upper face of the base plate 60' is sealingly connected to the lower face of the channeling plate 56'. Although the embodiment of FIG. 5 includes a plurality of second 20' and third 22' distribution channels, it is also possible that the second 54' and third 55 distribution ports are directly in communication with the inlet of the focusing chamber 24', without the need for distribution channels.

The following examples are provided to illustrate certain aspects of the invention, without limiting its broader scope as set forth in the claims.

EXAMPLES 1–5

A static mixer comprising an arrangement of stacked plates and using the principle of cyclone mixing as described previously was constructed of glass to observe cyclone formation under various conditions. Water and air were injected into the mixing chamber in tangential and radial directions, respectively, with respect thereto. A high speed camera with digital image processing was used to observe whether a helical flow of the flowing liquid was established. This was readily determined from observing the path of gas bubbles within the water stream. The results of these experiments are summarized in Table 1.

TABLE 1

| Example # | Water Flow (ml/hr) | Air Flow (ml/hr) | Kinetic Energy Ratio water/air | Cyclone Formation (Y/N) |
|---|---|---|---|---|
| 1 | 100 | 7,800 | 0.04 | N |
| 2 | 600 | 12,000 | 0.66 | Y |
| 3 | 900 | 12,000 | 1.49 | Y |

TABLE 1-continued

| Example # | Water Flow (ml/hr) | Air Flow (ml/hr) | Kinetic Energy Ratio water/air | Cyclone Formation (Y/N) |
|---|---|---|---|---|
| 4 | 600 | 3,600 | 7.41 | Y |
| 5 | 900 | 3,600 | 16.7 | Y |

From these results, the desired spiral flow formation was obtained with a kinetic energy ratio of liquid/gas of 0.66 and higher. The lower bound of the kinetic energy ratio of the tangentially/radially flowing fluids is estimated at about 0.5. It should be noted that much higher throughputs of tangentially flowing fluids may prevent cyclone formation if the flow regime is changed from laminar to turbulent. In this case, however, thorough mixing will still take place.

What is claimed is:

1. An apparatus for mixing a first fluid stream and a second fluid stream, the apparatus comprising:
   a) a plurality of first fluid distribution conduits for distributing the first fluid stream, each first supply conduit having a first supply conduit receiving end for receiving the first fluid stream and having a first supply conduit discharge end opposite the first supply conduit receiving end;
   b) a plurality of second fluid distribution conduits for distributing the second fluid stream, each second supply conduit having a second supply conduit receiving end for receiving the second fluid stream and having a second supply conduit discharge end opposite the second supply conduit receiving end;
   c) a mixing chamber in fluid communication with the first and second supply conduits at first and second supply conduit discharge ends, where one of the first or second supply conduit discharge ends leads substantially tangentially into the mixing chamber and the other of the first or second supply conduit discharge ends leads substantially radially into the mixing chamber;
   d) a mixing chamber outlet for discharging a mixed stream of the first and second fluid streams from the mixing chamber, the mixing chamber outlet in fluid communication with the central region of the mixing chamber; and
   e) a plurality of supply conduits, each having a receiving end and a discharge end, the receiving ends in alternating fluid communication with the first and second fluid distribution conduits and the discharge ends in fluid communication with the mixing chamber, where the discharge ends lead alternately substantially tangentially and substantially radially into the mixing chamber.

2. The apparatus of claim 1 where the mixing chamber is substantially cylindrical in shape.

3. The apparatus of claim 2 where the mixing chamber has a substantially circular cross section in a substantially horizontal plane from which the mixing chamber outlet leads substantially perpendicularly.

4. The apparatus of claim 2 where the mixing chamber outlet conduit has a circular cross section and the ratio of the diameter of the mixing chamber to that of the mixing chamber outlet is greater than about 5.

5. The apparatus of claim 1 where at least one of the first or second supply conduits narrows in the direction from the supply conduit receiving end to the supply conduit discharge end.

6. The apparatus of claim 1 where the ratio of the length to the width, at their discharge ends, of the first and second supply conduits is from about 1 to about 30.

7. The apparatus of claim 1 further comprising:
   a) a plurality of second fluid distribution conduits for distributing the second fluid stream;
   b) a plurality of third fluid distribution conduits for distributing a third fluid stream;
   c) a manifold having an inlet and an outlet, the manifold inlet in fluid communication with the second and third distribution conduits arranged in a repeating sequence, and the manifold outlet in fluid communication with the second supply conduit receiving end.

8. The apparatus of claim 7 where the manifold outlet has a curved surface.

9. The apparatus of claim 7 where the ratio of the sum of the cross sectional areas of the second and third distribution conduits to the cross sectional area of the second supply conduit receiving end is from about 1.5 to about 500.

10. A layered assembly for mixing at least two fluids, the assembly comprising:
    a) a substantially planar cover layer having external and internal faces and defining first and second feed channels for receiving first and second fluids into the assembly, the first and second feed channels extending from the external surface to the internal surface to form first and second inlet ports, and;
    b) a substantially planar mixing layer having an upper and a lower face, the mixing layer upper face sealingly disposed on the cover layer internal face to define:
       i) a first supply channel having a first supply channel receiving end in fluid communication with the first feed channel and a first supply channel discharge end opposite the first supply channel receiving end;
       ii) a second supply channel having a second supply channel receiving end in fluid communication with the second feed channel and a second supply channel discharge end opposite the second supply channel receiving end, and
       iii) a mixing chamber in fluid communication with the first and second supply channel discharge ends, where one of the first or second supply channel discharge ends leads substantially tangentially into the mixing chamber and the other of the first or second supply channel discharge ends leads substantially radially into the mixing chamber, and;
       iv) a mixing chamber outlet channel in fluid communication with the mixing chamber for discharging a mixed stream of the first and second fluids from the mixing chamber.

11. The layered assembly of claim 10 where the cover layer and mixing layer each comprise one or more plates in a fluid-tight stacked arrangement.

12. The layered assembly of claim 11 where the plates are of an inert material selected from the group consisting of polymers, metals, alloys, glass, quartz, ceramic, and semiconductor materials.

13. The layered assembly of claim 11 where the plates have a thickness from about 10 $\mu$m to about 5 mm.

14. The layered assembly of claim 10 where mixing chamber outlet is in fluid communication with the central region of the mixing chamber.

15. The layered assembly of claim 10 where the mixing chamber outlet extends substantially perpendicularly from the mixer plate to the mixing layer lower face to form an outlet port for discharging a mixed stream of the first and second fluids from the assembly.

16. The layered assembly of claim 10 where the mixing chamber outlet extends substantially perpendicularly from the mixer plate to the cover layer external face to form an outlet port for discharging a mixed stream of the first and second fluids from the assembly.

17. The layered assembly of claim 10 where the mixing chamber is substantially cylindrical in shape.

18. The layered assembly of claim 10 where the ratio of the diameter of the mixing chamber to the width of each of the first and second supply channel discharge ends is greater than about 10.

19. The layered assembly of claim 10 where the mixing chamber is in fluid communication with a plurality of supply channels, each having a receiving end and a discharge end and the supply channel discharge ends lead alternately substantially tangentially and substantially radially into the mixing chamber, the layered assembly further comprising a substantially planar distribution layer having an upper face and a lower face, the distribution layer upper face sealingly disposed on the cover layer internal face and the distribution layer lower face sealingly disposed on the mixing layer upper face, the distribution layer interposed between the cover layer and the mixing layer to define:

a) a plurality of first distribution ports, each in fluid communication at one end with a first fluid distributing structure and separately in fluid communication at the opposite end with alternating receiving ends of the fluid supply channels, and;

b) a plurality of second distribution ports, each in fluid communication at one end with a second fluid distributing structure and separately in fluid communication at the opposite end with alternating receiving ends of the fluid supply channels not in fluid communication with the first distribution ports, where the first fluid distributing structure is in fluid communication with the first feed channel, the second fluid distributing structure is in fluid communication with the second feed channel, and the mixing layer upper face is sealingly disposed on the distribution layer lower face to define the supply channels.

20. The layered assembly of claim 10 where the cover layer further defines a third feed channel for receiving a third fluid into the assembly, the third feed channel extending from the cover layer external surface to the cover layer internal surface to form a third inlet port, the layered assembly further comprising a substantially planar distribution layer having an upper face and a lower face, the distribution layer upper face sealingly disposed on the cover layer internal face and the distribution layer lower face sealingly disposed on the mixing layer upper face, the distribution layer interposed between the cover layer and the mixing layer to define:

a) a plurality of second distribution ports, each having a second distribution port inlet end in fluid communication with a second fluid distributing structure and having a second distribution port outlet end, and;

b) a plurality of third distribution ports, each having a third distribution port inlet end in fluid communication with a third fluid distributing structure and having a third distribution port outlet end, where the second fluid distributing structure is in fluid communication with the second feed channel, the third fluid distributing structure is in fluid communication with the third feed channel, and the mixing layer upper face is sealingly disposed on the distribution layer lower face to define a focusing chamber having an inlet and an outlet, the focusing chamber inlet in fluid communication with the second and third distribution port outlet ends arranged in a repeating sequence and the focusing chamber outlet in fluid communication with the second supply channel receiving end.

21. The layered assembly of claim 20 where the focusing chamber outlet defines curved surface.

22. The layered assembly of claim 20 where the ratio of the sum of the cross sectional areas of the second and third distribution port outlet ends to the cross sectional area of the second supply channel receiving end is from about 1.5 to about 500.

23. A process for mixing at least two fluid streams, the process comprising:

a) flowing a first fluid stream through a first feed channel and injecting the first fluid stream in a substantially radial direction into a mixing chamber;

b) flowing a second fluid stream through a second feed channel and injecting the second fluid stream in a substantially tangential direction into the mixing chamber to create a vortex;

c) withdrawing a stream of mixed first and second fluids from the central portion of the vortex; and d) flowing a plurality fluid streams through a plurality of feed channels and injecting the fluid streams in alternating tangential and radial directions into the mixing chamber.

24. The process of claim 23 where the ratio of the kinetic energy of the second fluid to that of the first fluid is at least about 0.5 to yield a fluid vortex within the mixing chamber.

25. The process of claim 23 where the mixing chamber is substantially cylindrical in shape.

26. The process of claim 23 further comprising accelerating the first and second fluid streams through the feed channels in the direction of the mixing chamber.

27. The process of claim 23 further comprising:

a) distributing the second feed channel among a plurality of second distribution streams;

b) distributing a third fluid stream among a plurality of third fluid distribution streams;

c) arranging the second and third distribution streams in a repeating sequence in the second feed channel prior to injection into the mixing chamber.

28. The process of claim 27 where the first fluid stream is a gas and the second fluid stream is a liquid.

* * * * *